United States Patent
Ma et al.

(10) Patent No.: US 9,819,290 B2
(45) Date of Patent: Nov. 14, 2017

(54) POWER TOOL AND MOTOR DRIVE CIRCUIT THEREOF

(71) Applicant: Johnson Electric S.A., Murten (CH)

(72) Inventors: Hai Bo Ma, Hong Kong (CN); Yong Gang Li, Shenzhen (CN); Yong Sheng Gao, Shenzhen (CN); Jin Yun Gan, Shenzhen (CN); Yuk Tung Lo, Hong Kong (CN); Wei Long Lan, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

(21) Appl. No.: 15/260,815

(22) Filed: Sep. 9, 2016

(65) Prior Publication Data

US 2017/0077851 A1    Mar. 16, 2017

(30) Foreign Application Priority Data

Sep. 11, 2015  (CN) .......................... 2015 1 0579083
Dec. 2, 2015   (CN) .......................... 2015 1 0875455

(51) Int. Cl.
| | |
|---|---|
| H02P 1/04 | (2006.01) |
| H02P 6/18 | (2016.01) |
| H02P 6/20 | (2016.01) |
| H02K 7/14 | (2006.01) |
| B25F 5/00 | (2006.01) |

(52) U.S. Cl.
CPC ............... *H02P 6/183* (2013.01); *B25F 5/00* (2013.01); *H02K 7/145* (2013.01); *H02P 6/181* (2013.01); *H02P 6/20* (2013.01)

(58) Field of Classification Search
CPC .................................. H02P 6/183; B25F 5/00
USPC ..................................................... 318/400.33
See application file for complete search history.

(56) References Cited

U.S. PATENT DOCUMENTS

| | | | |
|---|---|---|---|
| 2013/0187587 A1* | 7/2013 | Knight | H02P 6/08 318/400.37 |
| 2013/0314007 A1* | 11/2013 | Yanagihara | B25F 5/00 318/139 |
| 2013/0333910 A1* | 12/2013 | Tanimoto | B25B 21/02 173/176 |

* cited by examiner

*Primary Examiner* — Erick Glass
(74) *Attorney, Agent, or Firm* — Muncy, Geissler, Olds & Lowe, P.C.

(57) ABSTRACT

A power tool and a motor drive circuit thereof are provided. The motor drive circuit includes an inverter, a controller and a current sensor. The inverter includes a plurality of semiconductor switches and configured to convert a voltage from a power supply into an alternating current for an electric motor. The controller is configured to output detecting signals and drive signals for the inverter. The current sensor is configured to sample a current flowing through the motor, the current comprising a plurality of driving current portions corresponding to the drive signals and a plurality of position detecting current portions corresponding to the detecting signals. The controller determines the drive signals at least based on the position detecting current portions of the current so as to control power modes of the semiconductor switches in the inverter in a starting stage of the motor.

16 Claims, 6 Drawing Sheets

POWER TOOL AND MOTOR DRIVE CIRCUIT THEREOF

CROSS REFERENCE TO RELATED APPLICATIONS

This non-provisional patent application claims priorities under 35 U.S.C. §119(a) from Patent Application No. CN201510579083.9 filed in The People's Republic of China on Sep. 11, 2015 and Patent Application No. CN201510875455.2 filed in The People's Republic of China on Dec. 2, 2015.

FIELD

The present disclosure relates to a power tool, and in particular to a motor drive circuit for the power tool.

BACKGROUND

A power tool, for example, an electric saw, is an important tool in production and daily life of people, for forest harvesting, bucking, lopping and wood sawing. At present, an electric saw powered by combusting gasoline is cumbersome, gasoline-consuming and heavily polluting in field operations. Furthermore, an electric saw is generally started with no load, and starts cutting after outputting a relatively high torque. During cutting of the electric saw, a sawing blade thereof rapidly rubs against materials such as wood, and if there is a knur in the wood, the electric saw may occasionally jam when sawing the knur. In this case, the sawing blade of the electric saw is clamped in the wood, and it is hard to restart the electric saw in a clamped status. The sawing blade of the electric saw has to be taken out from the clamping wood, such that the electric saw is in a no-load status and restarts to continue cutting the wood. The operations are complex, operating efficiency is low, and workloads of workers are increased.

SUMMARY

A power tool with a high starting torque and a motor drive circuit thereof are provided in the present disclosure.

A motor drive circuit is provided according to embodiments of the present disclosure. The motor drive circuit includes an inverter, a controller and a current sensor. The inverter includes a plurality of semiconductor switches and configured to convert a voltage from a power supply into an alternating current for an electric motor. The controller is configured to output detecting signals and drive signals for the inverter. The current sensor is configured to sample a current flowing through the motor, the current comprising a plurality of driving current portions corresponding to the drive signals and a plurality of position detecting current portions corresponding to the detecting signals. The controller determines the drive signals at least based on the position detecting current portions of the current so as to control power modes of the semiconductor switches in the inverter in a starting stage of the motor.

Preferably, the position of the rotor is virtually divided into a plurality of sectors in a circumferential direction and in the starting stage of the motor the controller is configured to determine the sector where a specific magnetic field position of the rotor is based on change in the position detecting current portions and to send drive signals corresponding to the determined sector to turn on corresponding semiconductor switches of the inverter.

Preferably, in the starting stage of the motor, each detecting signal include at least two groups of detecting pulse sequence signals, the controller continuously outputs the detecting signals which sequentially turn on the semiconductor switches corresponding to the plurality of sectors and determines an initial sector where the specific magnetic field position of the rotor is, based on the position detecting current portions sensed after the detecting signals are loaded on the motor.

Optionally, the controller is configured to determine the sector corresponding to a detecting signal which corresponds to a current pulse with maximum energy in the position detecting current portions as the initial sector where the specific magnetic field position of the rotor is.

Optionally, the controller is configured to determine the sector corresponding to a detecting signal which corresponds to a current pulse with maximum amplitude in the position detecting current portions as the initial sector where the specific magnetic field position of the rotor is.

Preferably, the controller has different control modes in a starting stage of the motor and in a normal operating stage of the motor.

Preferably, after the initial sector is determined the controller is configured to output drive signals and detecting signals alternately.

Preferably, after the initial sector is determined the controller is configured to output drive signals corresponding to the sector where the specific magnetic field position of the rotor currently is and then a detecting signal corresponding to the sector next to the current sector and to determine whether the specific magnetic field position of the rotor moves to a next sector based on change of two adjacent groups of current pulses in a corresponding position detecting current portion.

Optionally, the controller is configured to determine that the specific magnetic field position of the rotor enters the next sector in a case that energy of the two adjacent groups of current pulses in the corresponding position detecting current portion changes from a lower level to a higher level and to determine that the specific magnetic field position of the rotor is still in current sector in a case that energy of the two adjacent groups of current pulses in the corresponding position detecting current portion changes from a higher level to a lower level.

Optionally, the controller is configured to determine that the specific magnetic field position of the rotor enters the next sector in a case that two maximum current pulses of the two adjacent groups of current pulses in the corresponding position detecting current portion changes from a lower level to a higher level and to determine that the specific magnetic field position of the rotor is still in current sector in a case that the two maximum current pulses of the two adjacent groups of current pulses in the corresponding position detecting current portion changes from a higher level to a lower level.

Preferably, the detecting signals include a series of detecting pulse signals or a series of groups of detecting pulse sequence signals and energy of the series of detecting pulse signals or the series of groups of detecting pulse sequence signals is equal.

Preferably, the detecting signals include a series of detecting pulse signals or a series of groups of detecting pulse sequence signals and widths and amplitudes of the pulses of the series of detecting pulse signals or the series of groups of detecting pulse sequence signals are equal.

Preferably, each detecting signal includes at least two groups of detecting pulse sequence signals and an interval between two adjacent detecting pulses in each group of detecting pulse sequence signal is shorter than a time period for the motor to be fully discharged after being charged by a previous pulse of the two adjacent detecting pulses.

Preferably, the controller is further configured to compare the current sampled by the current sensor with a predetermined current value, and in a case that the sampled current is greater than the predetermined current value, send drive signals to turn off the semiconductor switches in the inverter so as to stop powering the motor, wherein the predetermined current value is no more than 1.4 times a maximum value of the position detecting current portions.

A motor drive circuit is provided according to embodiments of the present disclosure. The power tool includes a housing, a working head extended from the housing, a motor configured to drive the working head, a battery configured to provide power to the motor and an above described motor drive circuit.

Preferably, the power tool is an electric saw or an electric drill.

Preferably, the motor is a single-phase direct current brushless motor or a three-phase direct current brushless motor.

DETAILED DESCRIPTION

Figure 1:
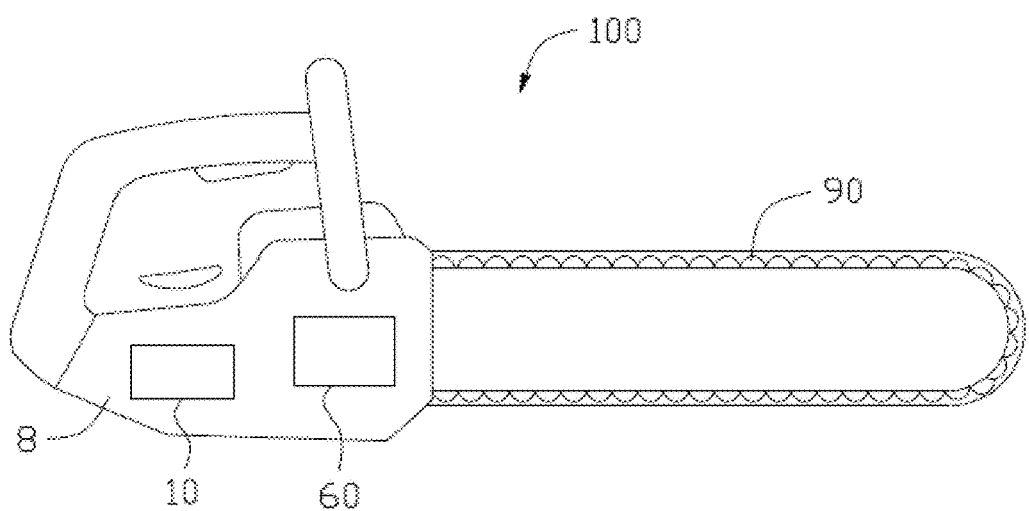
FIG. 1 is a diagram of an electric saw according to an embodiment of the disclosure.

The embodiments of the present disclosure are described in detail in conjunction with the drawings, so that technical solutions of the present disclosure and beneficial effects may be clear. It should be understood that the drawings are merely for reference and description, rather than limiting the disclosure. Dimensions in the drawings are merely for clear description, rather than limiting scaling relations.

Figure 2:
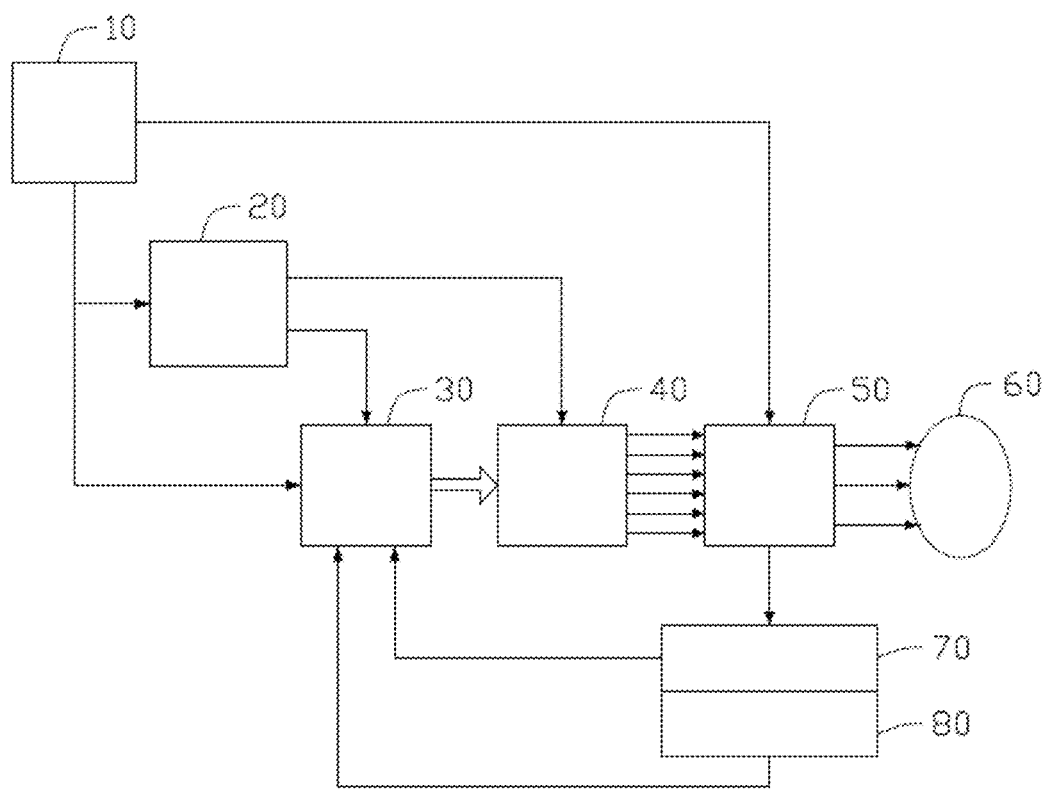
FIG. 2 is a block diagram of a circuit of the electric saw in FIG. 1.

Referring to FIGS. 1 and 2, an electric saw 100 according to an embodiment of the present disclosure includes a housing 8, a battery 10 inside the housing 8 and providing power for the electric saw, a motor 60 and a motor drive circuit. The motor drive circuit includes a power manager 20, a controller 30, a driver 40, an inverter 50, an over-temperature protection circuit 70 and a current sensor 80. The motor 60 drives a sawing blade 90 of the electric saw extended from the housing 8 through a transmission mechanism, so that the electric saw can saw the wood.

The battery 10 provides power for the motor 60. In the embodiment, the battery 10 is a lithium ion battery, while in other embodiments the battery may be other kinds of battery, such as a nickel-metal hydride battery, a lithium polymer battery, a fuel battery or a solar battery. The battery 10 may be a rechargeable battery, and is installed in the electric saw 100 in a detachable manner. In the embodiment, a supply voltage provided by the battery 10 is between 30V and 100V, and an output power of the motor is at least 3 KW. An operating current of the motor is between 40 A and 90 A, and a maximum operating current of the motor is less than 120 A.

The power manager 20 is connected to the battery 10, the controller 30 and the driver 40, and is configured to reduce the voltage provided by the battery 10 to a first voltage, which is preferably 5V, and a second voltage different from the first voltage Preferably the second voltage is greater than the first voltage and preferably is 12V. The first voltage is provided to the controller 30 and the second voltage is provided to the driver 40. It should be understandable that, in other embodiments, based on requirements of different electronic elements in the motor, the power manager 20 may transform the output voltage of the battery 10 to other different voltages.

The driver 40 is connected between the controller 30 and the inverter 50, and the inverter 50 is connected to the motor 60. The inverter 50 includes multiple semiconductor switches, and the controller 30 outputs PWM (Pulse Width Modulation) drive signals to control the semiconductor switches in the inverter, so as to control a power mode of the motor 60. The driver 40 is configured to perform voltage boosting or current amplifying on the drive signals outputted by the controller 30. The driver 40 may be a gate driver. It should be understandable that the driver 40 may not be provided in a case that the drive signals outputted by the controller 30 are strong enough to drive the semiconductor switches in the inverter 50. In this embodiment, the controller 40 also output detecting signals for detecting position of the rotor in the starting stage of the motor.

Figure 3:
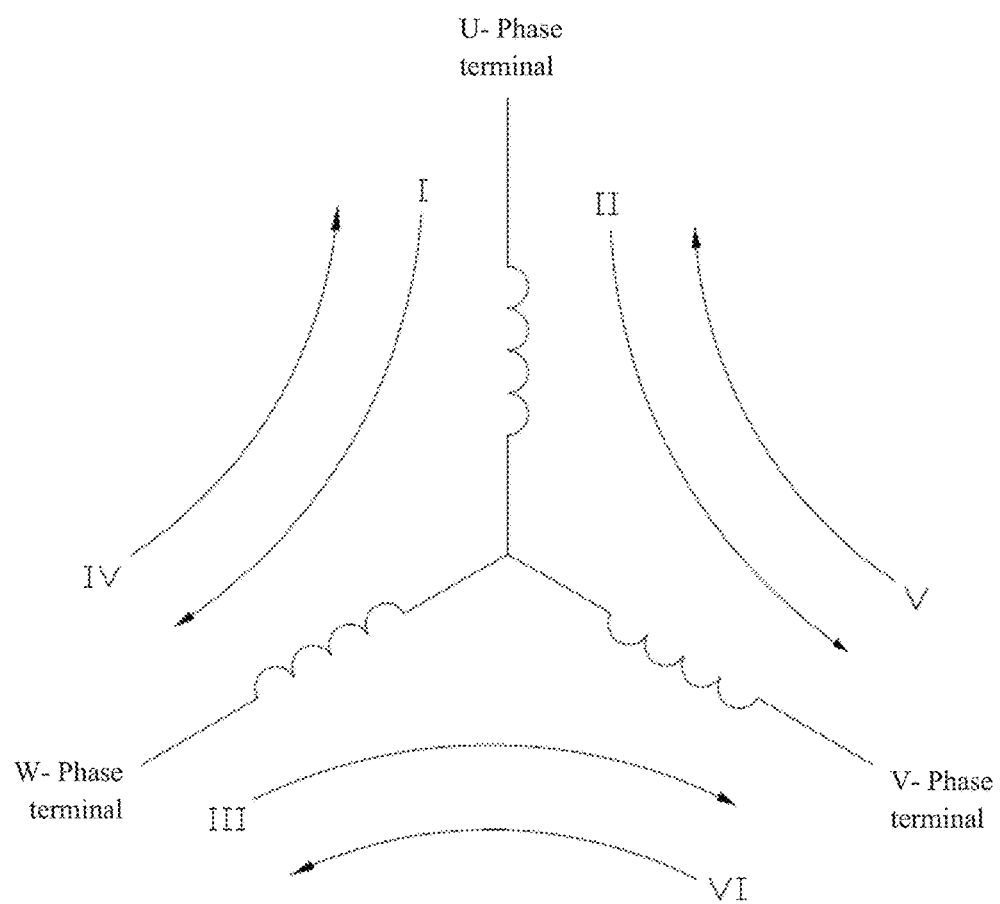
FIG. 3 shows three-phase stator windings of a motor of the electric saw and current commutation of the stator windings.

As shown in FIG. 3, in the embodiment, the motor 60 is a three-phase brushless direct current motor (also referred to as BLDC). The motor 60 includes a stator and a rotor rotatable relative to the stator. The stator includes a stator core and stator windings wound on the stator core. The stator core may be made of a soft magnetic material such as pure iron, cast iron, cast steel, electrical steel or silicon steel. The rotor includes a permanent magnet and a cooling fan. The stator windings of the three-phase brushless direct current motor includes a U-phase winding, a V-phase winding and a W-phase winding. In a preferred embodiment, the three-phase windings form Y-shaped connection. One terminal of the U-phase winding, one terminal of the V-phase winding and one terminal of the W-phase winding are respectively denoted as a U-phase terminal, a V-phase terminal and a W-phase terminal and are configured to be connected to the inverter 50, and the other terminals of the U-phase winding, the V-phase winding and the W-phase winding are all connected to a neutral point.

Figure 4:
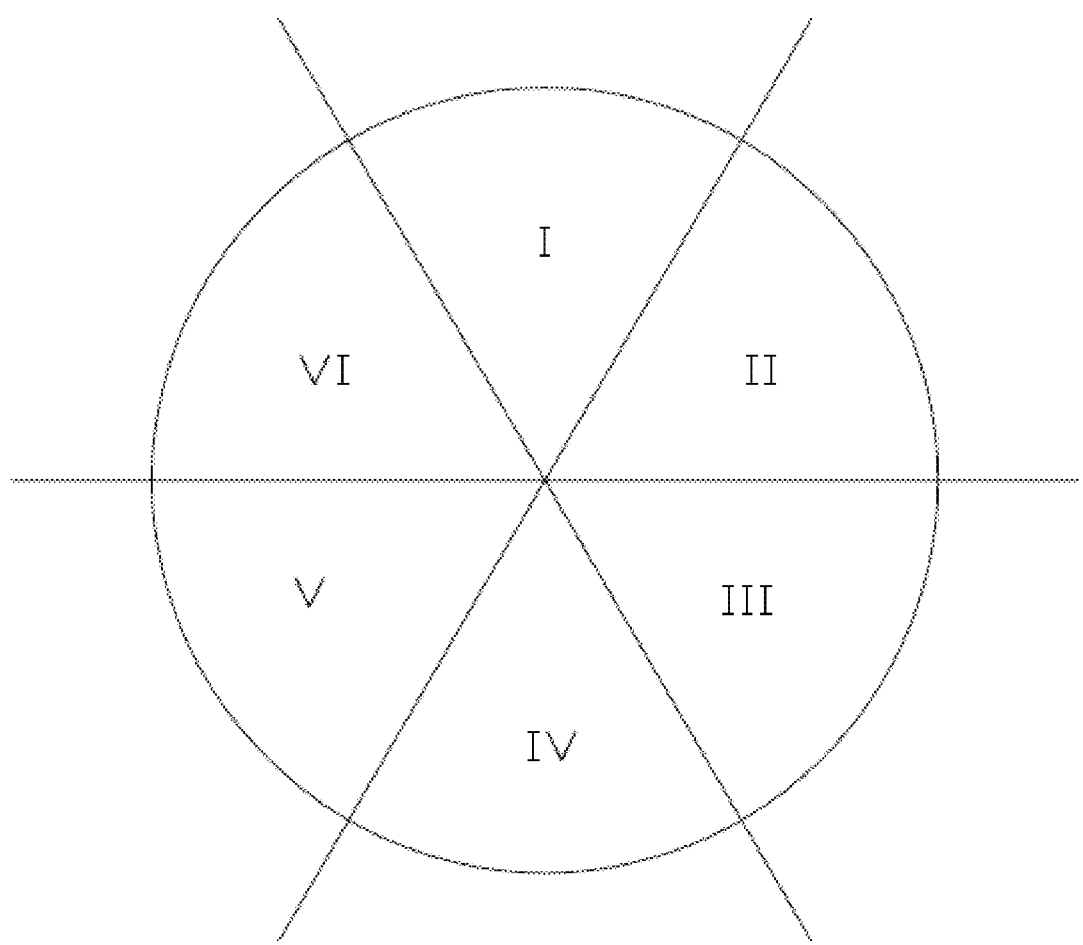
FIG. 4 shows six sectors of position of a rotor, virtually divided along a circumferential direction of the rotor.

As shown in FIG. 4, position of the rotor of the motor 60 is virtually divided into six sectors in a circumferential direction, and each of the six sectors covers an angle of 60 degrees, i.e., the motor needs to commutate every time the rotor rotates for 60 degrees. Although the embodiment is described with the stator winding connected in a Y-shape, the disclosure is not limited to this connection in practical implementations, and the stator winding may be connected in a triangle form alternatively. It should be understandable the disclosure is not limited to any specified number of switches or any specified number of phases of the windings. In other embodiments, the motor 60 may be a single-phase, a two-phase or a multi-phase brushless motor.

Figure 5:
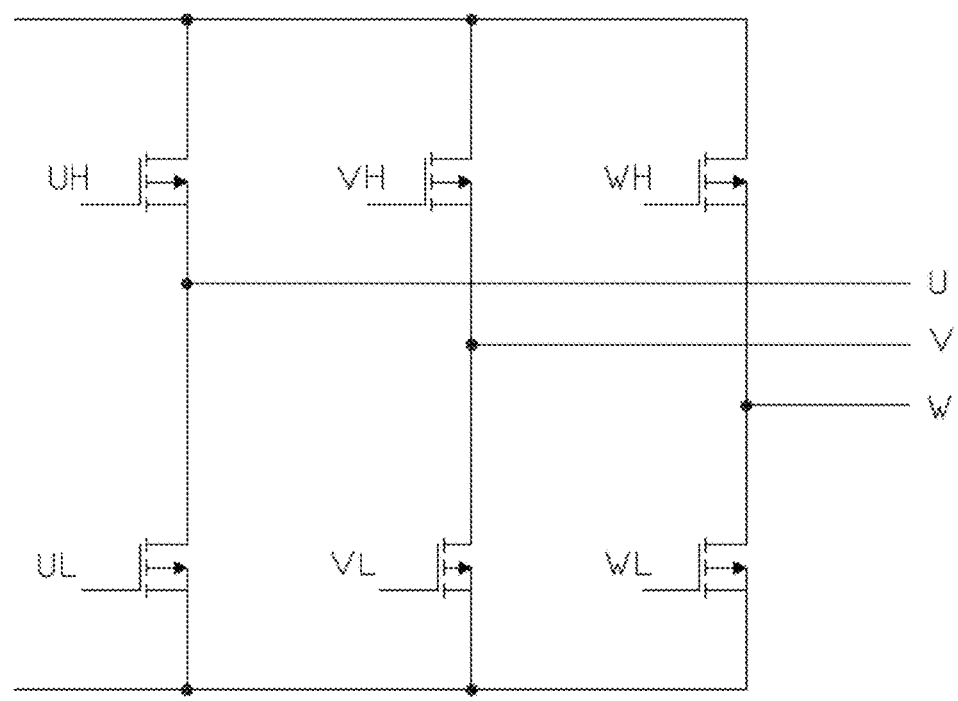
FIG. 5 shows a diagram of a circuit for implementation of the inverter in FIG. 2.

As shown in FIG. 5, the inverter 50 includes six semiconductor switches, the six semiconductor switches form three bridge arms which are respectively connected to the three terminals of the three-phase windings. Two semiconductor switches controlling the U-phase winding include an upper arm switch UH and a lower arm switch UL, two semiconductor switches controlling the V-phase winding include an upper arm switch VH and a lower arm switch VL, and two semiconductor switches controlling the W-phase winding include an upper arm switch WH and a lower arm switch WL. The driver 40 outputs six drive signals which are connected to control terminals of the semiconductor switches. Two semiconductor switches in each bridge arm are interlocked during the motor being powered, i.e., only one of the two semiconductor switches is turned on. In the embodiment, the six semiconductor switches are all NPN type MOSFETs, and each semiconductor switch may include a flyback diode (not shown in the drawings) to prevent breaking down of the semiconductor switch due to a flyback voltage of the motor. A gate of each of the six switches serves as a control terminal of the semiconductor switch and is connected to the driver 40, a drain of each of the upper arm switches is connected to a node with higher voltage, which is preferably an anode of the battery 10 to receive power, a source of each of the upper arm switches is connected to the drain of a corresponding lower arm switch in the same bridge arm, and sources of the bottom arm switches are connected to a node with lower voltage. In the embodiment, the driver 40 is a MOSFET driver. In other embodiments, some of the six semiconductor switches may be MOSFETs, and the others may be insulated gate bipolar transistors (IGBT) or bipolar junction transistors (BJT), or the six semiconductor switches are all IGBTs or bipolar junction transistors.

Below table 1 shows Correspondence relationship between the sector where a specific magnetic field position of the rotor is and the semiconductor switches required to be turned on. Corresponding switches are turned on when the specific magnetic field position of is in different sectors, such that a matching current may flow through the stator winding, which allows the motor to start with a high torque.

TABLE 1

| Sectors | Windings turned on | semiconductor switches to be turned on |
|---|---|---|
| I | U-phase winding, W-phase winding | UH, WL |
| II | U-phase winding, V-phase winding | UH, VL |
| III | W-phase winding, V-phase winding | WH, VL |
| IV | W-phase winding, U-phase winding | WH, UL |
| V | V-phase winding, U-phase winding | VH, UL |
| VI | V-phase winding, W-phase winding | VH, WL |

Figure 6:
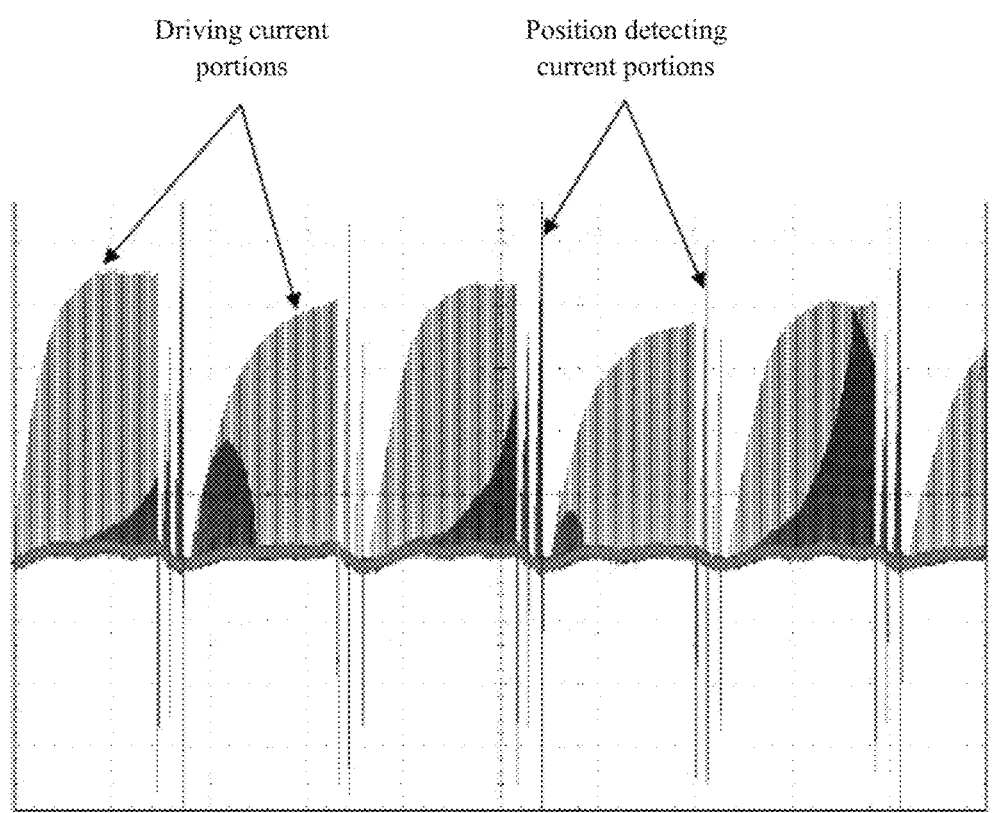
FIG. 6 shows a motor current signal detected by a current sensor in a starting stage.

The current sensor 80 is connected to the three lower arm switches UL, VL and WL, and is configured to sense a total current flowing through the three-phase windings. Referring to FIG. 6, in the starting phase of the motor, the current may include multiple driving current portions corresponding to drive signals and multiple position detecting current portions corresponding to detecting signals according to the embodiment. The drive signals generate a drive force to drive the rotor to rotate, the detecting signals are used to detect position of the rotor. In a preferred embodiment, detecting signals may be a series of detecting pulse signals or a series of groups of detecting pulse sequence signals and each of the position detecting current portions may include a single current pulse, a group of current pulses, or at least two groups of current pulses. The current sensor 80 is connected to the controller 30. Preferably, the current sensor 80 may be a sampling resistor.

The over-temperature protection circuit 70 is connected to the controller 30 and includes a heat sensor which preferably includes a thermistor. The heat sensor is configured to sense an operating temperature of the motor.

According to the present disclosure, if the sawing blade of the electric saw is clamped in the wood during the cutting, the electric saw need be started again and it is required to detect current position of the specific magnetic field position of the rotor of the motor 60. The current position determines which two semiconductor switches of the inverter 50 are triggered at first. During starting of the motor, the controller 30 continuously outputs six detecting signals corresponding to the six sectors and determines the sector where the specific magnetic field position of the rotor initially is, based on energy or amplitudes of the position detecting current portions which are obtained after the six detecting signals have been loaded on corresponding stator windings of motor. In a preferred embodiment, a sector, which corresponds to a position detecting pulse portion with a current pulse having maximum energy or maximum amplitude, is the initial sector where the specific magnetic field position of the rotor is. After the initial sector is determined the controller outputs drive signals and detecting signals alternately. The controller 30 sends drive signals corresponding to the initial sector, and voltage boosting or current amplifying are performed on the drive signals by the driver 40 such that the drive signals drive corresponding MOSFETs in the inverter 60 to be turned on or turned off to allow stator windings corresponding to the initial sector to be powered. The controller then outputs a detecting signal corresponding to the sector next to the initial sector and determines if the specific magnetic field position of the rotor moves to the next sector. If the specific magnetic field position of the rotor moves to the next sector the controller outputs driving signals corresponding to the next sector and if the specific magnetic field position of the rotor is still in the initial sector, the controller repeatedly outputs driving signals corresponding to the initial sector. In this way, the motor can be started with a high torque under large load condition. According to the embodiment of the present disclosure a maximum starting torque or maximum locked torque of the motor can be not less than 4 Nm. In one embodiment, each of the detecting signals may contain a single one detecting pulse signal. Alternatively, each of the detecting signals may include at least two groups of detecting pulse sequence signals. Whether the specific magnetic field position of the rotor moves to the next sector may be determined based on changes of two adjacent groups of current pulses in the position detecting current portions corresponding to two adjacent groups of detecting pulse sequence signals in a detect signal.

For example, after the electric saw jams in sawing wood, the motor is powered again. The controller 30 continuously outputs six detecting signals, determines that the specific magnetic field position of the rotor is in the second sector II, and sends, drive signals to turn on semiconductor switches UH and VL which correspond to the second sector II according to table 1. The voltage provided by the battery 10 passes through the U-phase winding and the V-phase winding and generates a magnetic field, to drive the rotor to rotate. During the starting phase of the motor, a rotational speed of the rotor is low, and the controller 30 sends detecting signals corresponding to the third sector III after the drive signals for the semiconductor switches UH and VL corresponding to the second sector II. In a preferred embodiment, at least two groups of detecting pulse sequence signals are used for rotor position detection. The at least groups of detecting pulse sequence signals have equal energy. Preferably, detecting pulses of the at least two groups of detecting pulse sequence signals have equal widths and amplitudes. And an interval between two adjacent detecting pulses in each group of detecting pulse sequence signals is preferably shorter than a time period for the motor to be fully discharged after being charged by a previous pulse of the two adjacent detecting pulses. Preferably, the controller 30 determines that the specific magnetic field position of the rotor is still in the second sector in a case that energy of two adjacent groups current pulses in the corresponding position detecting current portion changes from a higher level to a lower level and determines that the specific magnetic field position of the rotor moves to the next sector in a case that energy of two adjacent groups of current pulses in the corresponding position detecting current portion changes from a lower level to a higher level. After determining that the specific magnetic field position of the rotor moves to the next sector, the controller 30 sends drive signals to turn on the switches WH and VL in the inverter 50 corresponding to the third sector where the specific magnetic field position of the rotor enters, so that a current through the stator winding can commutate and the magnetic field generated by the stator winding can continue to drive the rotor to rotate with a high torque in the same direction. In the preferred embodiment, when the motor is in a starting stage from an instant the electric saw is powered to an instant the motor reaches a predetermined rotational speed, 300 rpm (revolutions per minute) for example, commutation of the stator winding can be controlled in above described way. When the motor enters a normal operating stage reaching the predetermined rotational speed, commutation of the stator winding can be performed through a traditional way of determining the zero crossing of a back electromotive force. That is, in the embodiment of the disclosure, the controller has different control modes in the starting stage of the motor and in the normal operating stage of the motor.

In the case of using groups of detecting pulse sequence signals, whether the specific magnetic field position of the rotor moves into the next sector may be determined preferably by comparing the maximum current pulse of each of two adjacent groups of current pulses in a position detecting current portion. The advantage of using groups of detecting pulse sequence signals is that amplitude of pulses in the current sensed by the current sensor can be limited, thus over-current protection will not be wrongly triggered during the position detection.

After the electric saw starts to operate, the current sensor 80 keeps sampling the current of the motor 60, and the controller 30 compares the sampled current with a predetermined current value. In a case that the sampled current is greater than the predetermined current value, it is determined that an overcurrent occurs, and the controller 30 sends drive signals to the inverter 50 to turn off the semiconductor switches in the inverter 50 so as to stop powering the motor, thereby providing over-current protection for the motor. Preferably, the predetermined current value does not exceed 1.4 times a maximum value of the position detecting current portions.

The over-temperature protection circuit 70 is configured to sample a temperature of the motor 60 during operation. In a case that the temperature of the motor 60 reaches a predetermined temperature value, the controller 30 sends drive signals to the inverter 50 to turn off semiconductor switches in the inverter 50 so as to stop powering the motor. In this way, the motor will not be damaged due to over-temperature in the case of power failures or overload operation of the motor, thereby improving performance and reliability of the motor.

Preferably, the electric saw in the present disclosure is powered by the battery 10 with a rated voltage of 72V and an output power of 3.6 KW. Electronic components with high limit parameters, such as rated voltage and rated power, should be selected due to high power and high voltage of the battery 10, so as to achieve stability and reliability during operation of the motor. Uses battery instead of gasoline as power source can reduce a weight of the electric saw and avoid environment pollution.

In the preferred embodiment of the present disclosure, a magnetic sensor for detecting rotor position is not required therefore the motor has a low cost, a simple structure, less cables and less connector terminals. Further, the present disclosure is not limited to be applied in an electric saw, it can be used in other suitable power tool (for example, an electric drill), especially for the motor driven power tool with heavy loads. In a preferred embodiment of an electric drill, a rated output power of the motor may be between 700 W and 1000 W, the maximum starting torque or maximum stall torque of the motor is no less than 3 Nm, and the maximum operating current of the motor is less than 90 A. The operating voltage of the battery is between 10V and 30V, and a rated operating current of the brushless direct current motor during operation is between 20 A and 80 A.

The above-described embodiments are only preferred embodiments of the disclosure, and are not intended to limit the disclosure. Any modification, equivalent replacement or improvement within the essence and principle of the present disclosure shall fall within the protection scope of the present disclosure.

The invention claimed is:

1. A motor drive circuit, comprising:
   an inverter including a plurality of semiconductor switches and configured to convert a voltage from a power supply into an alternating current for an electric motor;
   a controller configured to output detecting signals and drive signals for the inverter; and
   a current sensor configured to sample a current flowing through the motor, the current comprising a plurality of driving current portions corresponding to the drive signals and a plurality of position detecting current portions corresponding to the detecting signals;
   wherein the controller determines the drive signals at least based on the position detecting current portions of the current so as to control power modes of the semiconductor switches in the inverter in a starting stage of the motor;
   wherein the controller has different control modes in a starting stage of the motor and in a normal operating stage of the motor.

2. The motor drive circuit according to claim 1, wherein the position of the rotor is divided into a plurality of sectors in a circumferential direction and in the starting stage of the motor the controller is configured to determine the sector where a specific magnetic field position of the rotor is based on change in the position detecting current portions and to send drive signals corresponding to the determined sector to turn on corresponding semiconductor switches of the inverter.

3. The motor drive circuit according to claim 2, wherein in the starting stage of the motor, each detecting signal includes at least two groups of detecting pulse sequence signals, the controller continuously outputs the detecting signals which sequentially turn on the semiconductor switches corresponding to the plurality of sectors and determines an initial sector where the specific magnetic field position of the rotor is, based on the position detecting current portions sensed after the detecting signals are loaded on the motor.

4. The motor drive circuit according to claim 3, wherein the controller is configured to determine the sector corresponding to a detecting signal which corresponds to a current pulse with maximum energy in the position detecting current portions as the initial sector where the specific magnetic field position of the rotor is.

5. The motor drive circuit according to claim 3, wherein the controller is configured to determine the sector corresponding to a detecting signal which corresponds to a current pulse with maximum amplitude in the position detecting current portions as the initial sector where the specific magnetic field position of the rotor is.

6. The motor drive circuit according to claim 3, wherein after the initial sector is determined the controller is configured to output drive signals and detecting signals alternately.

7. The motor drive circuit according to claim 3, wherein after the initial sector is determined the controller is configured to output drive signals corresponding to the sector where the specific magnetic field position of the rotor currently is and then a detecting signal corresponding to the sector next to the current sector and to determine whether the specific magnetic field position of the rotor moves to a next sector based on change of two adjacent groups of current pulses in a corresponding position detecting current portion.

8. The motor drive circuit according to claim 7, wherein the controller is configured to determine that the specific magnetic field position of the rotor enters the next sector in a case that energy of the two adjacent groups of current pulses in the corresponding position detecting current portion changes from a lower level to a higher level and to determine that the specific magnetic field position of the rotor is still in current sector in a case that energy of the two adjacent groups of current pulses in the corresponding position detecting current portion changes from a higher level to a lower level.

9. The motor drive circuit according to claim 7, wherein the controller is configured to determine that the specific magnetic field position of the rotor enters the next sector in a case that two maximum current pulses of the two adjacent groups of current pulses in the corresponding position detecting current portion changes from a lower level to a higher level and to determine that the specific magnetic field position of the rotor is still in current sector in a case that the two maximum current pulses of the two adjacent groups of current pulses in the corresponding position detecting current portion changes from a higher level to a lower level.

10. The motor drive circuit according to claim 1, wherein the detecting signals include a series of detecting pulse signals or a series of groups of detecting pulse sequence signals and energy of the series of detecting pulse signals or the series of groups of detecting pulse sequence signals is equal.

11. The motor drive circuit according to claim 1, wherein the detecting signals include a series of detecting pulse signals or a series of groups of detecting pulse sequence signals and widths and amplitudes of the pulses of the series of detecting pulse signals or the series of groups of detecting pulse sequence signals are equal.

12. The motor drive circuit according to claim 1, wherein each detecting signal includes at least two groups of detecting pulse sequence signals and an interval between two adjacent detecting pulses in each group of detecting pulse sequence signal is shorter than a time period for the motor to be fully discharged after being charged by a previous pulse of the two adjacent detecting pulses.

13. The motor drive circuit according to claim 1, wherein the controller is further configured to compare the current sampled by the current sensor with a predetermined current value, and in a case that the sampled current is greater than the predetermined current value, send drive signals to turn off the semiconductor switches in the inverter so as to stop powering the motor, wherein the predetermined current value is no more than 1.4 times a maximum value of the position detecting current portions.

14. A power tool, comprising:
a housing;
a working head extended from the housing;
a motor configured to drive the working head;
a battery configured to provide power to the motor; and
said motor drive circuit according to claim 1.

15. The power tool according to claim 14, wherein the power tool is an electric saw or an electric drill.

16. The power tool according to claim 14, wherein the motor is a single-phase direct current brushless motor or a three-phase direct current brushless motor.

* * * * *